United States Patent
Kubo et al.

(10) Patent No.: US 6,736,757 B2
(45) Date of Patent: May 18, 2004

(54) SPEED SHIFT CONTROL APPARATUS OF AUTOMATIC TRANSMISSION

(75) Inventors: Takayuki Kubo, Anjo (JP); Shigetaka Wakisaka, Anjo (JP); Tomokazu Nomura, Anjo (JP); Yoshizo Akita, Anjo (JP)

(73) Assignee: Aisin Aw Co., Ltd. (JP)

( * ) Notice: Subject to any disclaimer, the term of this patent is extended or adjusted under 35 U.S.C. 154(b) by 12 days.

(21) Appl. No.: 10/072,614

(22) Filed: Feb. 11, 2002

(65) Prior Publication Data

US 2002/0142886 A1 Oct. 3, 2002

(30) Foreign Application Priority Data

Mar. 30, 2001 (JP) ........................................ 2001-097854

(51) Int. Cl.⁷ .............................................. F16H 61/04
(52) U.S. Cl. ...................... 477/144; 477/905; 477/159; 701/55; 701/56
(58) Field of Search ................................ 477/144, 905, 477/133, 136, 141, 159, 163, 148, 149, 132, 139; 701/52, 55, 56

(56) References Cited

U.S. PATENT DOCUMENTS

| | | | | |
|---|---|---|---|---|
| 4,142,613 A | * | 3/1979 | Iijima ........................ | 192/221 |
| 4,576,065 A | * | 3/1986 | Speranza et al. ............. | 701/55 |
| 4,648,290 A | * | 3/1987 | Dunkley et al. .............. | 477/78 |
| 4,692,866 A | * | 9/1987 | Kosuge ........................ | 701/56 |
| 5,247,859 A | * | 9/1993 | Agusa et al. ................. | 477/129 |
| 5,345,843 A | * | 9/1994 | Fujita et al. ................. | 477/98 |
| 5,810,692 A | * | 9/1998 | Takiguchi et al. ............ | 477/144 |
| 6,108,600 A | * | 8/2000 | Lehner et al. ................ | 701/56 |
| 6,128,566 A | * | 10/2000 | Nishino ....................... | 701/52 |
| 6,264,580 B1 | * | 7/2001 | Tabata et al. ................ | 477/149 |
| 6,270,444 B1 | * | 8/2001 | Tsutsui et al. ............... | 477/143 |
| 6,346,063 B1 | * | 2/2002 | Kondo et al. ................. | 477/143 |
| 6,368,249 B1 | * | 4/2002 | Hubbard ....................... | 477/121 |
| 6,480,755 B1 | * | 11/2002 | Ootani et al. ................. | 701/51 |

* cited by examiner

Primary Examiner—Roger Pang
Assistant Examiner—David D. Le
(74) Attorney, Agent, or Firm—Lorusso, Loud & Kelly

(57) ABSTRACT

A downshift control determines whether a commanded downshift is a downshift oriented toward minimum shock or a downshift oriented toward responsiveness, based on inputs from various sensors. The oil pressure on the hydraulic servo which controls the releasing-side friction engagement element is controlled based on the determined downshift type (DT), so that the releasing-side friction engagement element is released in accordance with a selected one of a plurality of release patterns, i.e., release patterns corresponding to different downshift type indexes (Dt). The releasing speed of the releasing-side friction engagement element is changed in accordance with the downshift type. By properly determining the type of downshift, it becomes possible to realize a shift of a type in accordance with the driver's intention.

8 Claims, 12 Drawing Sheets

|   | C1 | C2 | C3 | B1 | B2 | B3 | B4 | B5 | F1 | F2 |
|---|----|----|----|----|----|----|----|----|----|----|
| N |   |   |   |   |   |   |   |   |   |   |
| 1ST | ○ |   |   |   |   | (○) |   | ○ |   | ○ |
| 2ND | ○ |   |   | □ | ○ |   |   | ○ | ○ |   |
| 3RD | ○ |   |   | ○ | ○ |   |   | ○ | ○ |   |
| 4TH | ○ |   | ○ | ○ | ○ |   | ○ |   | ○ |   |
| 5TH | ○ | ○ | ○ |   | ○ |   |   |   |   |   |
| 3Low | ○ | ○ |   |   | ○ |   | ○ | ○ |   |   |
| 4Low | ○ | ○ |   |   | ○ |   |   |   |   |   |
| REV |   | ○ |   |   |   | ○ |   | ○ |   |   |

○ ENGINE BRAKE OPERATION □ ACTUATION ACCORDING TO NEEDS

DTM

| DOWNSHIFT TYPE MAP | | DEGREE OF THROTTLE OPENING (th_) [%] | | | | | | | | |
|---|---|---|---|---|---|---|---|---|---|---|
| | | 3 | 7 | 15 | 25 | 35 | 50 | 75 | 100 | |
| AUTO | th_Diff <th_DiffMin | DT↙0 | DT↙0 | 0 | 0 | 0 | 0 | 50 | 100 | ⎬ DT |
| | th_Diff >th_DiffMax | DT↙0 | 0 | DT↙50 | DT↙100 | 100 | 100 | 100 | 100 | |
| MANUAL | th_Diff <th_DiffMin | 100 | 0 | 0 | 100 | 100 | 100 | 100 | 100 | ⎬ DT |
| | th_Diff >th_DiffMax | 100 | 0 | 0 | 100 | 100 | 100 | 100 | 100 | ⎬ DT |

DEGREE OF THROTTLE OPENING [%/sec]

{ th_DiffMin=100
  th_DiffMax=160

LINEAR INTERPOLATION BETWEEN th_DiffMin AND DiffMax

0: SLOW DOWNSHIFT (SHOCK-CRITICAL)
50: INTERMEDIATE DOWNSHIFT
100: QUICK DOWNSHIFT (RESPONSE-CRITICAL)

CONSTANT TO BE CHANGED

REGARDING RELEASING-SIDE OIL PRESSURE
• $P_{TA}$
• $\delta P_{TA}$
• $\delta P_l$

SPEED SHIFT CONTROL APPARATUS OF AUTOMATIC TRANSMISSION

INCORPORATION BY REFERENCE

The disclosure of Japanese Patent Application No. 2001-097854 filed on Mar. 30, 2001, including the specification, drawings and abstract, is incorporated herein by reference in its entirety.

BACKGROUND OF THE INVENTION

1. Field of the Invention

The invention relates to a shift control apparatus of an automatic transmission installed in a motor vehicle and, more particularly, to a speed shift control apparatus for a downshift.

2. Description of the Related Art

In the conventional art, when a downshift is determined, the downshift is accomplished by reducing the oil pressure on a releasing-side friction engagement element in the transmission to an initial pressure calculated from the degree of throttle opening, the input torque or the target shift time, thereby releasing the releasing-side friction engagement element.

Downshift commands can be roughly divided into a downshift command prompted by gradual depression of the accelerator pedal as in climbing a hill, and a downshift command prompted by rapid depression of the accelerator pedal, e.g., for overtaking another vehicle. The former is a downshift that is suddenly started when the driver does not intend a downshift at all. In this case, a shift operation with a reduced shock is desirable instead of a quick shift operation responsive to the accelerator operation. In the latter downshift, quick response of the shift operation to the accelerator operation is regarded as more important than reduced shift shock.

However, if response-critical control is performed for a downshift, a rather hard shift shock is inevitable, and shock will also occur during a downshift on a sloped road grade. Conversely, if shock-critical control is performed so as to avoid a shift shock, a quick response cannot be provided at the time of acceleration in passing and the like. Thus, there is the problem of providing a shift of a type in accordance with the driver's intention.

The downshift point could be changed in accordance with the speed of throttle pedal depression at the time of output of a downshift command. Likewise, it is conceivable the oil pressure for a hydraulic servo that operates a friction engagement element might be changed in accordance with the speed of accelerator depression. However, the speed of throttle pedal depression cannot be accurately detected at a pedal position near the maximum extent of depression of the accelerator pedal (full down), i.e., a position near the kickdown point, because at such a position, the remaining available stroke of the accelerator pedal is small. Since the speed of depression of the accelerator pedal near the kickdown point cannot be accurately detected, the prior art always performs the shift operation in a shift shock-critical fashion and therefore suffers from the drawback of insufficient responsiveness in passing situations, etc.

SUMMARY OF THE INVENTION

Accordingly, it is an object of the invention to provide speed shift control of an automatic transmission which properly determines the type of downshift and thereby provides a shift feel in accordance with a driver's intention.

The present invention provides a unique downshift control for a conventional automatic transmission which includes an input shaft receiving power from an engine output shaft, an output shaft operatively connected to the drive wheels, a plurality of frictional engagement elements selectively engaged to change the torque transfer path between the input shaft and the output shaft; and hydraulic servos that engage and disengage the friction engagement elements to effect the shift change. The control apparatus, of the apparatus of the present invention, which controls a downshift in such a transmission, includes a controller which receives signals from sensors for detection of various vehicle running conditions and outputs oil pressure control signals in accordance with the sensor input signals. The controller includes a control means for controlling the oil pressure to the hydraulic servos operating friction engagement elements which participate in the downshift to a predetermined speed stage, responsive to a downshift command. The controller further includes downshift type determining means for determining whether the downshift should be a type oriented toward minimum shock or a type oriented toward responsiveness, based on a detected degree of throttle opening and a detected speed of accelerator pedal depression. The control means controls the oil pressures to the hydraulic servos for the friction engagement elements based on the downshift type determined by the downshift type determining means.

The control means may include engaging side control means for controlling the oil pressure to the hydraulic servo for a friction engagement that is on the engaging side in the downshift and releasing side control means for controlling the oil pressure to the hydraulic servo for a friction engagement element that is on a releasing-side in the downshift. In this case, the releasing-side control means controls the oil pressure to the hydraulic servo for the friction engagement element on the releasing-side, based on the downshift type determined by the downshift type determining means. The downshift type determining means may take into account whether the downshift command has resulted from automatic operation of the transmission or a manual downshift by the driver.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a tabulation of operations of various friction engagement elements;

FIG. 9 is an example of a downshift map;

DETAILED DESCRIPTION OF PREFERRED EMBODIMENTS

A preferred embodiment of the invention will be described hereinafter with reference to the accompanying drawings.

Figure 1:
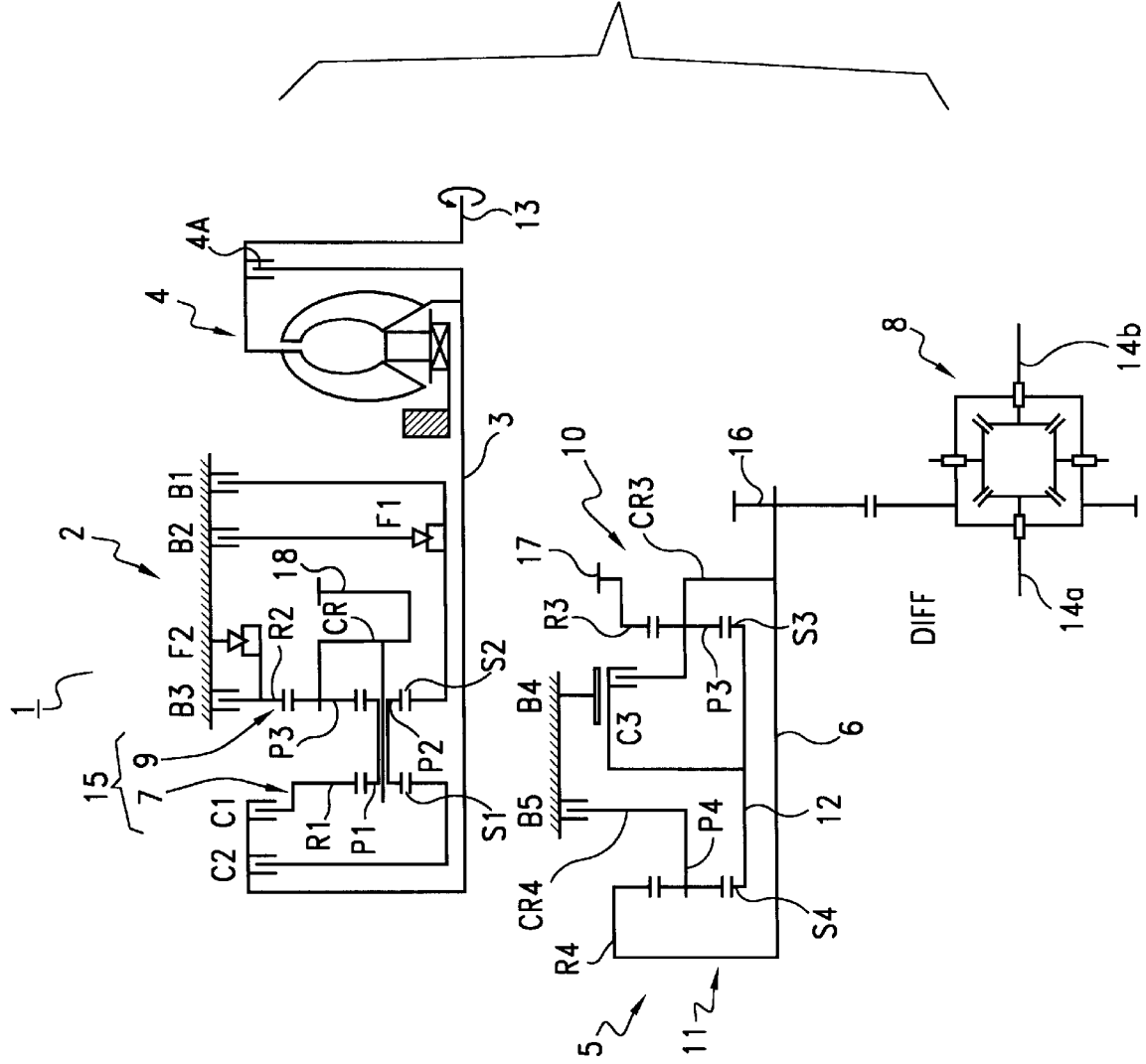
FIG. 1 is a skeletal diagram illustrating portions of the mechanism of an automatic transmission to which the invention is applicable.

As shown in FIG. 1, a 5-speed automatic transmission 1 includes a torque converter 4, a 3-speed main shift mechanism 2, a 3-speed subsidiary shift mechanism 5, and a differential 8. These units are interconnected and disposed within an integrally formed case. The torque converter 4 includes a lockup clutch 4a. The torque converter 4 inputs power from an engine crankshaft 13 to an input shaft 3 of the main shift mechanism 2 via fluid within the torque converter or via mechanical connection by the lockup clutch. The integral case rotatably supports a first shaft 3 (specifically, the input shaft) aligned with the crankshaft, a second shaft 6 (counter shaft) parallel to the first shaft 3 and a third shaft (left and right-side axles) 14a, 14b. A valve body is disposed on the external side of the case.

The main shift mechanism 2 has a planetary gear unit 15 that includes a simple planetary gear unit 7 and a double-pinion planetary gear unit 9. The simple planetary gear unit 7 includes a sun gear S1, a ring gear R1, and a carrier CR supporting pinions P1 meshed with the sun gear S1 and the ring gear R1. The double-pinion planetary gear unit 9 includes a sun gear S2 having a different number of teeth than the sun gear S1, a ring gear R2, and the common carrier CR supporting pinions P2 meshed with the sun gear S2 and pinions P3 meshed with the ring gear R2, as well as the pinions P1 of the simple planetary gear unit 7.

The input shaft 3 is drivingly connected to the engine crankshaft 13 via the torque converter 4 and is connectable to the ring gear R1 of the simple planetary gear unit 7 via an input (forward) clutch C1, and is also connectable to the sun gear S1 of the simple planetary gear unit 7 via a second (direct) clutch C2. The sun gear S2 of the double-pinion planetary gear unit 9 is directly braked (stopped) by a first brake B1, and also braked by a second brake B2 via a first one-way clutch F1. Furthermore, the ring gear R2 of the double-pinion planetary gear unit 9 is braked (stopped) by a third brake B3 and a second one-way clutch F2. The common carrier CR is connected to a counter drive gear 18 that serves as an output member of the main shift mechanism 2.

The subsidiary shift mechanism 5, on the other hand, includes an output gear 16, a first simple planetary gear unit 10 and a second simple planetary gear unit 11 that are axially disposed along the counter shaft (second shaft) in that order sequentially front to rear. The counter shaft 6 is rotatably supported by the integral case via a bearing. The first and second simple planetary gear units 10, 11 are the Simpson type.

In the first simple planetary gear unit 10, a ring gear R3 is connected to a counter driven gear 17 meshed with the counter drive gear 18, and a sun gear S3 is connected to a sleeve shaft 12 that is rotatably supported on the counter shaft 6. Furthermore, pinions P3 are supported by a carrier CR3 that is formed by a flange that is firmly connected to the counter shaft 6. The carrier CR3 supporting the pinions P3 at the opposite end thereof is connected to an inner hub of a UD direct clutch C3. In the second simple planetary gear unit 11, a sun gear S4 is formed on the sleeve shaft 12, and is therefore connected to the sun gear S3 of the first simple planetary gear unit. A ring gear R4 of the second simple planetary gear unit 11 is connected to the counter shaft 6.

The UD direct clutch C3 is disposed between the carrier CR3 of the first simple planetary gear unit and the interconnected sun gears S3, S4. The interconnected sun gears S3, S4 are stoppable by a fourth brake B4 which is a band brake. A carrier CR4 supporting pinions P4 of the second simple planetary gear unit is braked by a fifth brake B5.

Next, operation of a portion of the mechanism of a 5-speed automatic transmission will be described with reference to FIGS. 2 and 3.

In a first speed (1ST) state in D (drive) range, the forward clutch C1 is connected and the fifth brake B5 and the second one-way clutch F2 are engaged, so that the ring gear R2 of the double-pinion planetary gear unit and the carrier CR4 of the second simple planetary gear unit 11 are held in a stopped state. In this state, rotation of the input shaft 3 is transferred to the ring gear R1 of the simple planetary gear unit via the forward clutch C1. Furthermore, since the ring gear R2 of the double-pinion planetary gear unit is stopped, the common carrier CR is forwardly rotated at a considerably reduced speed while the sun gears S1, S2 are reversely rotated. That is, the main shift mechanism 2 is in the first speed state, and the reduced-speed rotation is transferred to the ring gear R3 of the first simple planetary gear unit of the subsidiary shift mechanism 5 via the counter gears 18, 17. The subsidiary shift mechanism 5 is in a first speed state where the carrier CR4 of the second simple planetary gear unit is stopped by a fifth brake B5. The reduced-speed rotation of the main shift mechanism 2 is further reduced in speed by the subsidiary shift mechanism 5, and is output from the output gear 16.

In second speed (2ND), the second brake B2 (and the first brake B1) is operated in addition to the forward clutch C1. Furthermore, the second one-way clutch F2 is released and the first one-way clutch F1 is engaged, while the fifth brake B5 remains engaged. In this state, the sun gear S2 is stopped by the second brake B2 and the first one-way clutch F1. Therefore, rotation of the ring gear R1 of the simple planetary gear unit, transferred from the input shaft 3 via the forward clutch C1, turns the carrier CR at a reduced speed in the forward direction while idling the ring gear R2 of the double-pinion planetary gear unit in the forward direction. Furthermore, the reduced-speed rotation is transferred to the subsidiary shift mechanism 5 via the counter gears 18, 17. That is, the main shift mechanism 2 is in a second speed state, and the subsidiary shift mechanism 5 is in the first speed state due to the engagement of the fifth brake B5. This combination of the second speed state and the first speed state achieves second speed for the automatic transmission 1 as a whole. Although in this case, the first brake B1 can be actuated, it is released when the second speed is established in coast-down.

In third speed (3RD), the forward clutch C1, the second brake B2, the first one-way clutch F1 and the first brake B1 are kept in the engaged state. Furthermore, the fifth brake B5 is released from the engaged state and the fourth brake B4 is engaged. That is, the main shift mechanism 2 is kept in the same state as in second speed, and the second-speed rotation is transferred to the subsidiary shift mechanism 5 via the counter gears 18, 17. In the subsidiary shift mechanism 5, rotation from the ring gear R3 of the first simple planetary gear unit is output as second-speed rotation from the carrier CR3 with the sun gear S3 and the sun gear S4 braked and prevented from rotating. Therefore, the combination of the second speed of the main shift mechanism 2 and the second speed of the subsidiary shift mechanism 5 achieve third speed for the automatic transmission 1 as a whole.

In fourth speed (4TH), the main shift mechanism 2 is in the same state as in second speed and third speed in which the forward clutch C1, the second brake B2, the first one-way clutch F1 and the first brake B1 are engaged. In the subsidiary shift mechanism 5, the fourth brake B4 is released and the UD direct clutch C3 is engaged. In this state, the carrier CR3 of the first simple planetary gear unit and the sun gears S3, S4 are connected, thereby achieving locked-up rotation in which the planetary gear units 10, 11 rotate together. Therefore, the combination of the second speed of the main shift mechanism 2 and the locked-up state (third speed) of the subsidiary shift mechanism 5 together effect output of fourth-speed rotation from the output gear 16, for the automatic transmission as a whole.

In fifth speed (5TH), the forward clutch C1 and the direct clutch C2 are engaged, so that rotation of the input shaft 3 is transferred to the ring gear R1 and the sun gear S1 of the simple planetary gear unit. Thus, the main shift mechanism 2 produces locked-up rotation in which the gear units rotate together. In this state, the first brake B1 is released, the second brake B2 is kept in the engaged state, and the first one-way clutch F1 idles. Therefore, the sun gear S2 idles. Furthermore, the subsidiary shift mechanism 5 is in the locked-up state of rotation in which the UD direct clutch C3 is engaged. Therefore, the combination of the third speed (locked-up state) of the main shift mechanism 2 and the third speed (locked-up state) of the subsidiary shift mechanism 5 together output fifth-speed rotation from the output gear 16, for the automatic transmission as a whole.

Furthermore, this automatic transmission provides intermediate speed stages that are put into operation during downshifts such as acceleration and the like, that is, a third speed-low and a fourth speed-low.

In the third speed-low state, the forward clutch C1 and the direct clutch C2 are engaged (although the second brake B2 is in the engaged state, the second brake B2 is overrun due to the first one-way clutch F1). Thus, the main shift mechanism 2 is in the third speed state in which the planetary gear unit 15 is locked up. The subsidiary shift mechanism 5 is in the first speed state where the fifth brake B5 is engaged. Therefore, the combination of the third speed state of the main shift mechanism 2 and the first speed state of the subsidiary shift mechanism 5 together provide a speed stage having a gear ratio that is between second speed and third speed, for the overall automatic transmission 1.

In the fourth speed-low state, the forward clutch C1 and the direct clutch C2 are engaged. Thus, the main shift mechanism 2 is in the third speed (locked-up) state as in the third speed-low state. The subsidiary shift mechanism 5 is in the second speed state where the fourth brake B4 is engaged and the sun gear S3 of the first simple planetary gear unit 10 and the sun gear S4 of the second simple planetary gear unit 11 are fixed. Therefore, the combination of the third speed state of the main shift mechanism 2 and the second speed state of the subsidiary shift mechanism 5 provide a speed stage for the overall transmission whose gear speed is between the third speed and the fourth speed.

In FIG. 2, a dot-line circle indicates a state where engine braking is in operation at the time of coasting (4th, 3rd or 2nd range). That is, during the first speed, the third brake B3 is actuated to prevent rotation of the ring gear R2 due to overrun of the second one-way clutch F2. Furthermore, during the second speed, the third speed and the fourth speed, the first brake B1 is actuated to prevent rotation of the sun gear S1 due to overrun of the first one-way clutch F1.

In an R (reverse) range, the direct clutch C2 and the third brake B3 are engaged, and the fifth brake B5 is engaged. In this state, rotation of the input shaft 3 is transferred to the sun gear S1 via the direct clutch C2. Furthermore, since the ring gear R2 of the double-pinion planetary gear is held in the stopped state by the third brake B3, the carrier CR is reversely rotated while the ring gear R2 of the simple planetary gear unit is reversely rotated. The reverse rotation is transferred to the subsidiary shift mechanism 5 via the counter gears 18, 17. In the subsidiary shift mechanism 5, the carrier CR4 of the second simple planetary gear unit is braked against rotation in the reverse direction as well, due to the fifth brake B5, and is therefore held in the first speed state. Therefore, the combination of the reverse rotation of the main shift mechanism 2 and the first-speed rotation of the subsidiary shift mechanism 5 together produce output of reduced-speed reverse rotation from the output gear 16.

Figure 12:
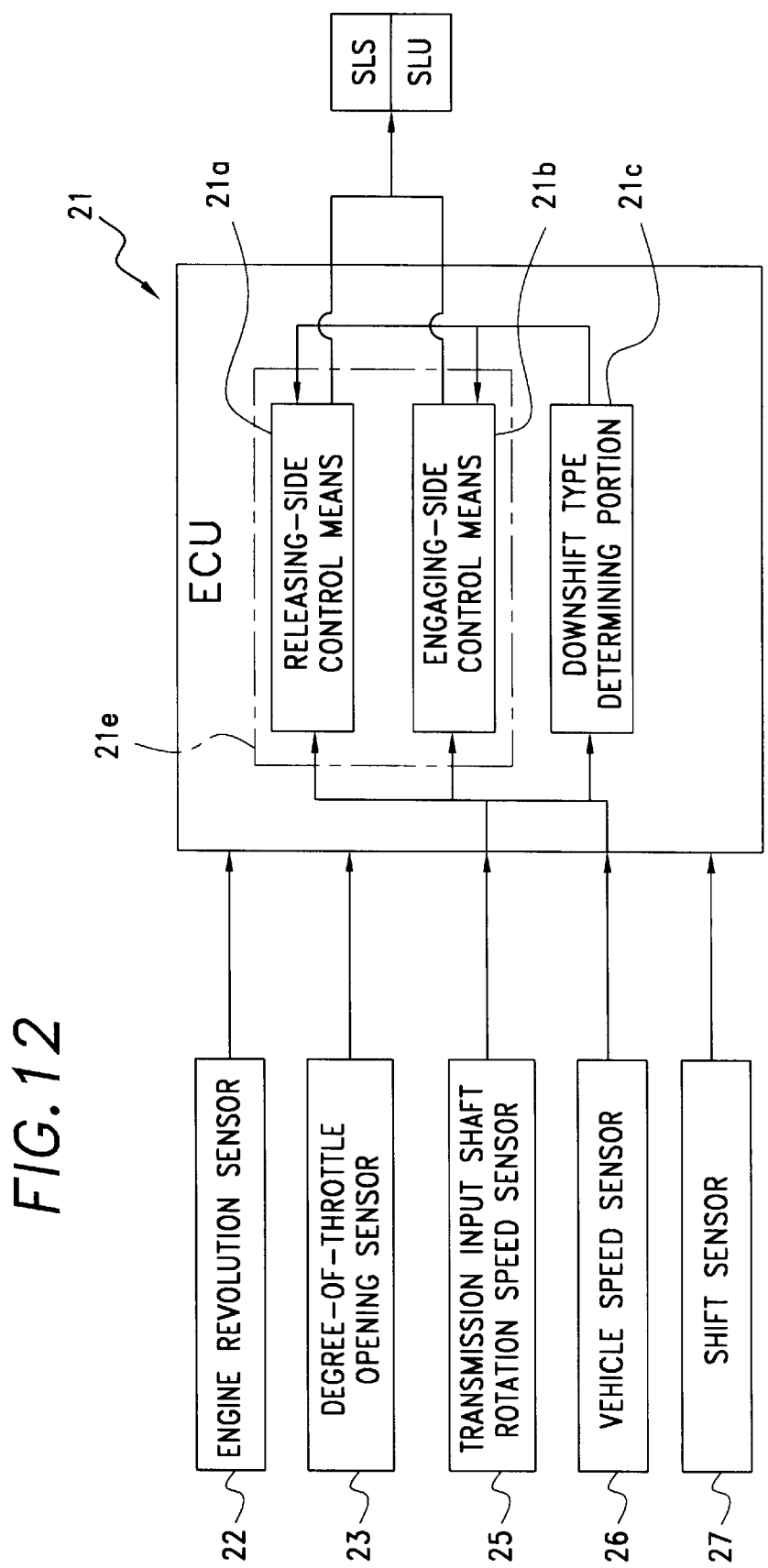
FIG. 12 is a block diagram of one example of an electric control circuit of an automatic transmission to which the invention is applied.

FIG. 12 is a block diagram illustrating an electric control system, in which reference numeral 21 represents a control unit (ECU), i.e., a microcomputer (mi-com). The control unit 21 receives input of signals from a degree-of-throttle-opening sensor 23 for detecting the degree to which the driver has depressed the accelerator pedal, a sensor 25 for detecting the input shaft rotational speed (=turbine rotation speed) of the transmission (automatic speed shift mechanism), a vehicle speed (=automatic transmission output shaft rotation speed) sensor 26, and a shift sensor 27 for detecting manual shift operations. The control unit 21 outputs signals to linear solenoid valves SLS, SLU of a hydraulic circuit. The control unit 21 includes a releasing-side control means 21a for controlling the releasing-side oil pressure, an engaging-side control means 21b for controlling the engaging-side oil pressure, and a downshift type determining portion 21c for determining whether the shift is a shock reduction-critical downshift or a response-critical downshift.

Figure 3:
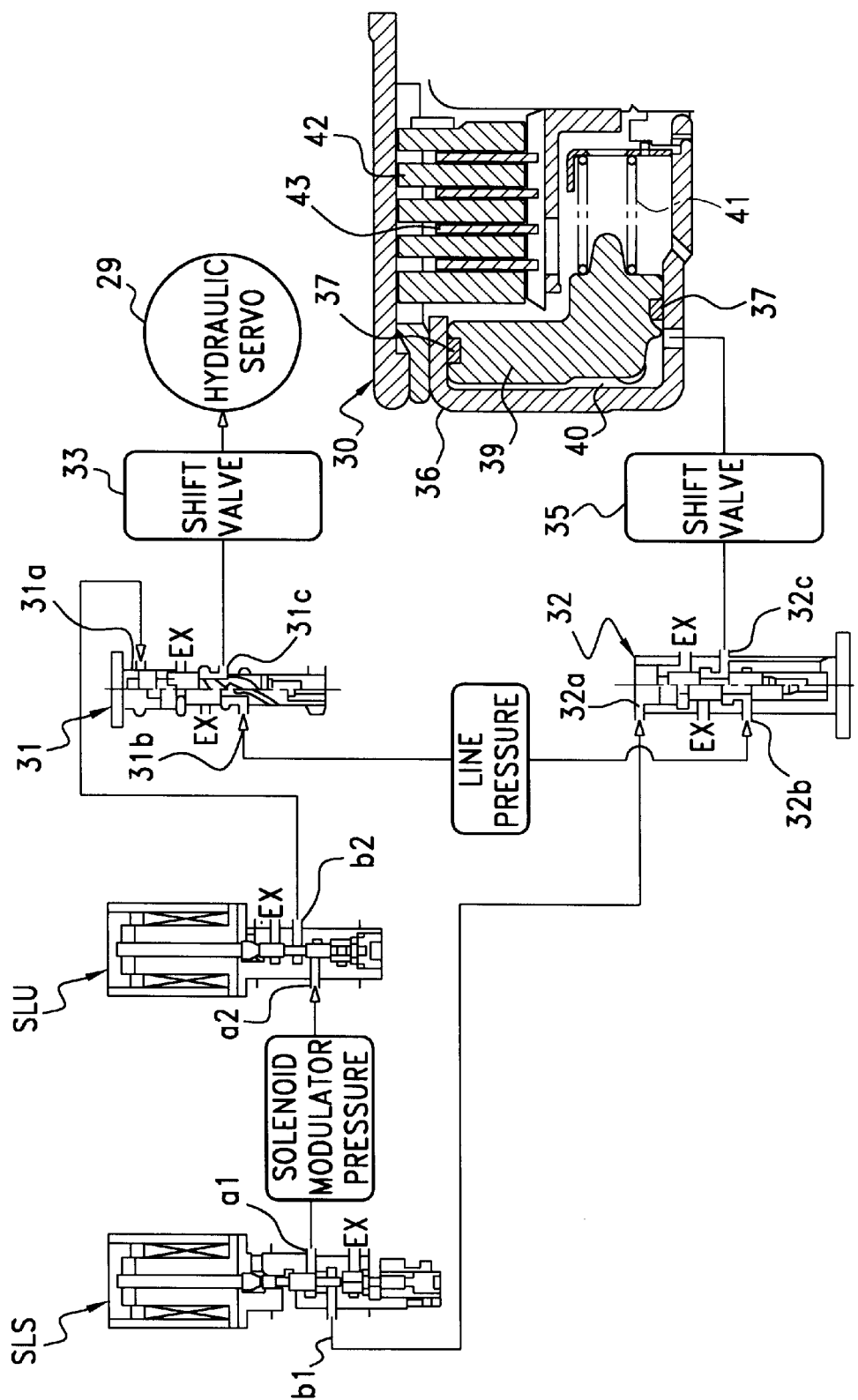
FIG. 3 is a schematic diagram of a hydraulic circuit for shifting by switching engagement of friction engagement elements (clutch-to-clutch shift)

FIG. 3 is a schematic diagram of the hydraulic circuit. The hydraulic circuit includes the aforementioned two linear solenoid valves SLS, SLU, and a plurality of hydraulic servos 29, 30 that engage and disengage a plurality of friction engagement elements (clutches and brakes) for achieving, for example, five forward speeds and one reverse speed, by changing the torque transfer path through the planetary gear units of the automatic speed shift mechanism. A solenoid modulator pressure is supplied to input ports a1, a2 of the linear solenoid valves SLS, SLU. Control oil pressures from output ports b1, b2 of the linear solenoid valves are supplied to control oil chambers 31a, 32a of pressure control valves 31, 32, respectively. Input ports 31b, 32b of the pressure control valves 31, 32 are supplied with a line pressure. Regulated oil pressures regulated by the control oil pressure are supplied from output ports 31c, 32c of the pressure control valves 31, 32 to the hydraulic servos 29, 30 via shift valves 33, 35, respectively.

The above description of a hydraulic circuit is presented merely for illustration of the basic concept of what is generally termed a clutch-to-clutch shift in which one friction engagement element is released while another friction engagement element is engaged. The hydraulic servos 29, 30 and the shift valves 33, 35 are symbolically shown but, in reality, many more hydraulic servos are provided in an automatic speed shift mechanism. Shown are a hydraulic servo for the fourth brake B4 and a hydraulic servo for the fifth brake B5 for the 3→2 shift, a hydraulic servo for the third clutch C3 and a hydraulic servo for the fourth brake B4 for the 4→3 shift, etc. There are also provided many shift valves for changing the oil pressures to be supplied to these hydraulic servos. As is shown for the hydraulic servo 30, each hydraulic servo has a piston 39 that is fitted into a cylinder 36 and made oil-tight by an oil seal 37. Responsive to the regulated oil pressure from the pressure control valve 32 that acts on an oil pressure chamber 40, the piston 39 moves overcoming the force from a return spring 41, so as to bring outer friction plates 42 and inner friction members 43 into contact with each other. Although the friction plates and the friction members are shown in the form of a clutch, such friction plates and friction members may also constitute a brake.

Control of the engaging-side and releasing-side friction engagement elements for a downshift operation will now be described with reference to FIGS. 4 to 8. The control of the releasing-side oil pressure PA will first be described. Basic control in a power-on downshift where a driver depresses the accelerator pedal to demand more speed will be described, and then control based on a determination of the type of downshift, which is a feature of the present invention, will be described.

Figure 5:
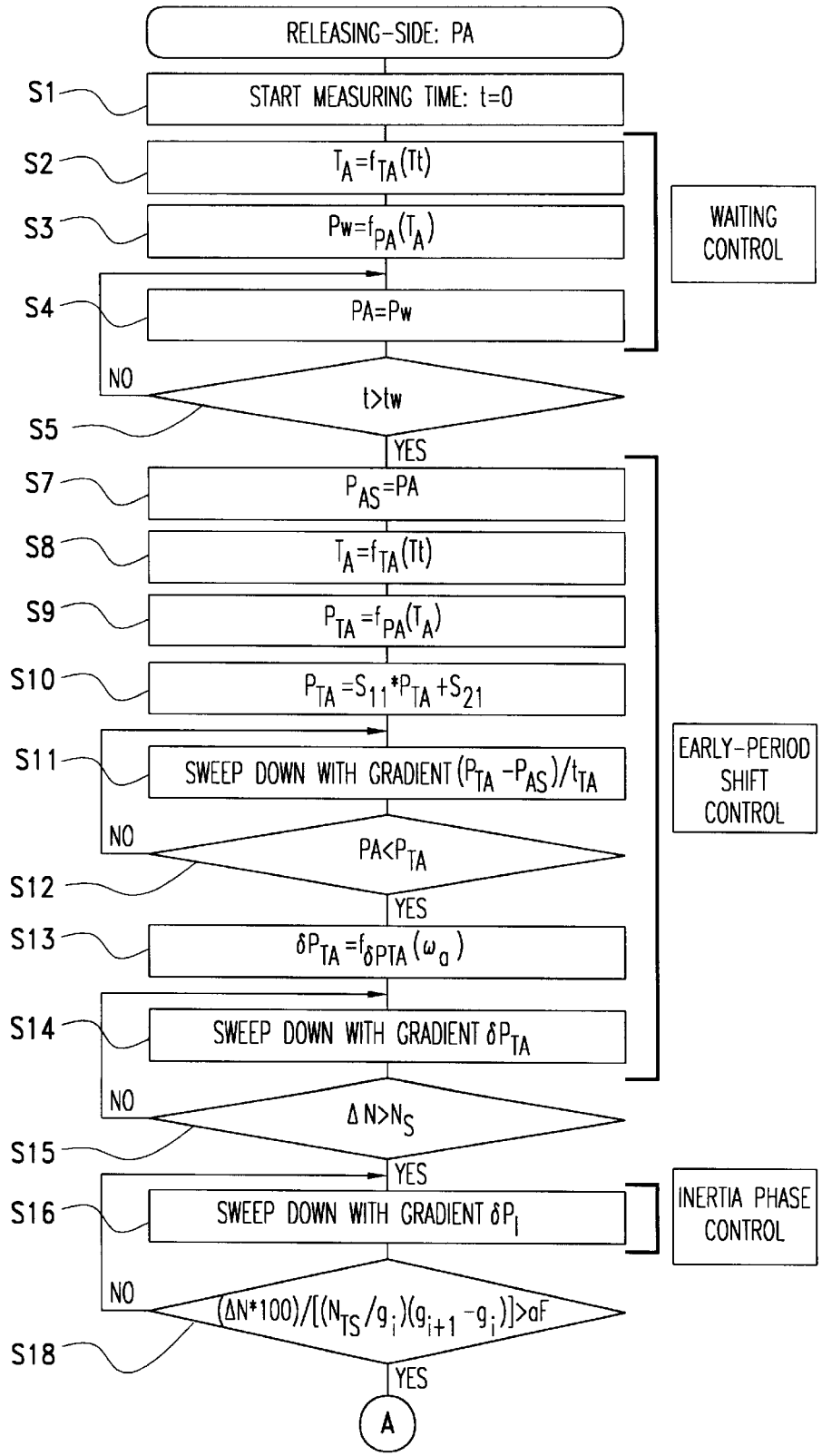
FIG. 5 is a flowchart of a routine for releasing oil pressure in a clutch-to-clutch downshift.
Figure 6:
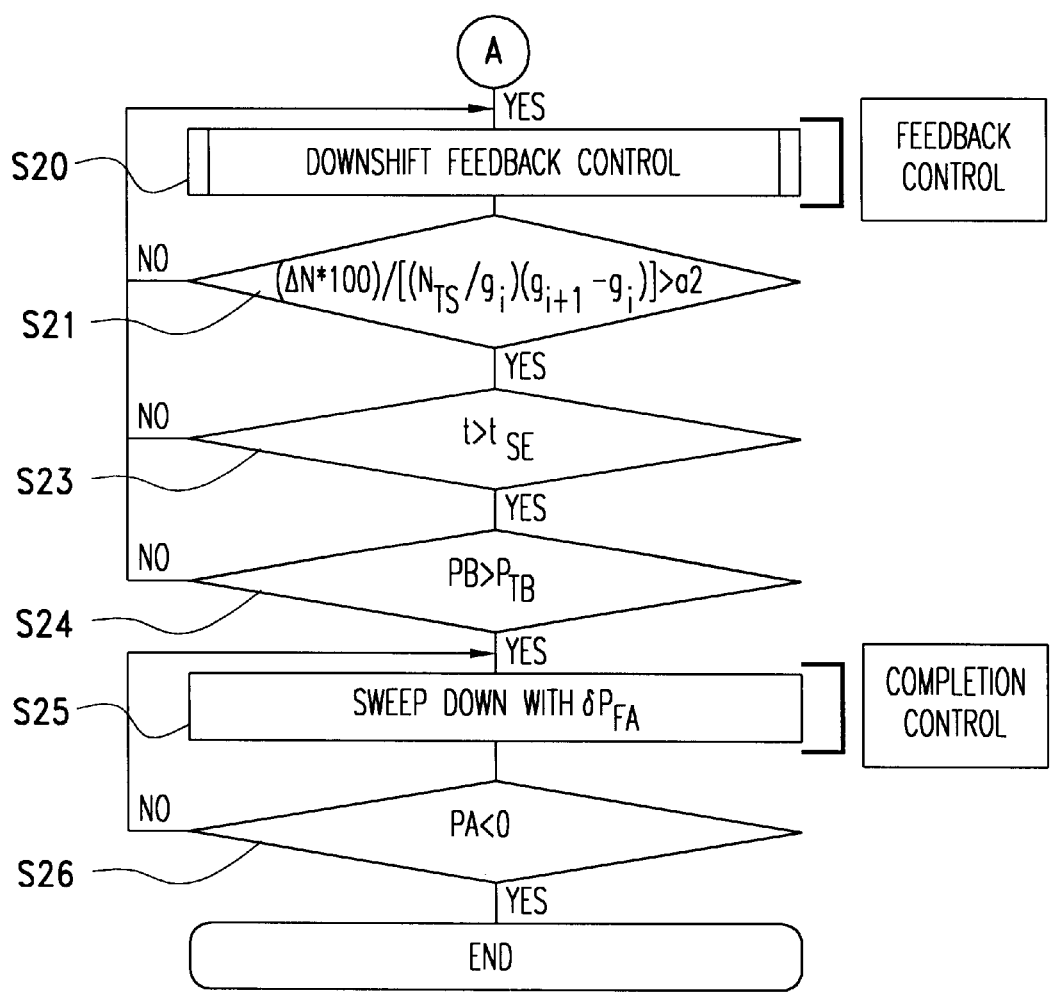
FIG. 6 is a flowchart that is a continuation of FIG. 5.

In an ordinary power-on downshift, the control unit 21 determines a downshift based on the signals from the degree-of-throttle-opening sensor 23 and the vehicle speed sensor 26 with reference to the map. Then, the control unit 21 starts to clock time and initiates the shift control (S1) after a predetermined time delay following the shift determination as shown in FIG. 5. At the initiation point in time (t=0), the releasing-side oil pressure PA equals the engaging pressure, and the releasing-side friction engagement element is in an engaged state. Then, a releasing-side torque TA is calculated as a function of the input torque Tt (S2). The input torque Tt can be determined in the following manner. That is, an engine torque is determined based on the degree of throttle opening and the engine rotational speed with reference to the map. Furthermore, a speed ratio is calculated from the input and output rotational speeds of the torque converter, and a torque ratio is determined from the speed ratio with reference to the map. The input torque Tt is determined by multiplying the engine torque by the torque ratio. Furthermore, the releasing-side torque TA is determined from the input torque by factoring in a torque share fraction and the like.

A waiting engaging pressure Pw on the releasing-side is calculated from the releasing-side torque TA (S3). Control signals are output to linear solenoid valves so that the releasing-side oil pressure PA becomes equal to the waiting engaging pressure Pw (S4). The control of the releasing-side oil pressure based on the input torque and the like is continued until a predetermined time tw has elapsed (S5). The process of steps S2 to S4 is a waiting control. The waiting control time tw is changed in accordance with the input torque Tt.

Thereafter, a predetermined releasing-side oil pressure PAS is calculated, and the releasing-side torque TA is calculated in the same manner as described above (S7, S8). Furthermore, a target oil pressure PTA is calculated based on the releasing-side torque TA (S9). A releasing-side target oil pressure PTA is calculated from allowance rates (tie-up degrees) S11, S21 by factoring in a drive feeling (S10). The allowance rates are determined from a suitable one of many degree-of-throttle opening-vehicle speed maps selected in accordance with oil temperature. Typical allowance rates are S11>1.0 and S21>0.0.

Furthermore, a gradient to the target oil pressure PTA is set from a preset time tTA as [(PTA−PAS)/tTA], and a sweep-down is performed with this gradient (S11). That is, during the power-on state, a sweep-down with a relatively sharp gradient is performed, and is continued until the releasing-side oil pressure PA reaches the target oil pressure PTA immediately before the start of the inertia phase (S12). Subsequently, a releasing-side oil pressure change δPTA is calculated based on the formula δPTA=fδPTA (ωa) (S13), wherein ωa is a target input shaft rotational speed change rate (target rotational acceleration) that is targeted at the time of initiation of a change in the input shaft rotational speed N relative to the output shaft rotational speed (i.e., gear ratio). Then, a (second) sweep-down is performed with a gradient of the oil pressure change δPTA (S14). During the power-on state, this sweep-down is continued from the pre-shift initiation input shaft rotational speed NS to the shift initiation determination rotation speed at which an amount of rotational speed change ΔN is detected with a predetermined precision (S15). The process of steps S7 to S14 is an early-period shift control during which the torque capacity of the releasing-side friction engagement element decreases but the speed shift does not progress.

After that, a sweep-down is performed with a gradient of a predetermined oil pressure change δPI, that is, a relatively gentle preset gradient (S16). This sweep-down is performed until aF [%] of the total amount of rotational speed change that occurs from the initiation of the shift (rotational speed change initiation) to the completion of the shift, that is, a predetermined degree of progress of the shift (S18), if during the power-on state, the releasing-side oil pressure PA is greater than the load pressure of the return spring, that is, the torque capacity of the releasing-side hydraulic servo is not "0". The degree of progress of the shift can be determined according to the formula:

$$(\Delta N \times 100)/(NTS/gi) \cdot (gi+1-gi)$$

wherein NTS is the input shaft rotational speed at the time of initiation of rotational speed change, ΔN is the amount of change in the input shaft rotational speed (the amount of change in the input shaft rotational speed relative to the output shaft rotational speed), based on the gear ratio from the initiation of the rotation change up to the present time, gi is the pre-shift gear ratio, and gi+1 is the post-shift gear ratio. The sweep-down with the gradient δP1 is an inertia phase control, during which the input shaft rotational speed NT starts to change based on the target gear ratio.

When the degree of progress of the shift exceeds the predetermined degree of progress of the shift aF [%] at which the change in the input shaft rotational speed NT becomes stable, for example, 20%, a downshift feedback control (S20) is initiated. This feedback control is continued until the degree of progress of the shift reaches a2 [%] close to the rotational speed upon completion of the total rotational speed change to the gear ratio at which the downshift is completed, for example, 90% (S21). In relation to the control of the engaging-side oil pressure described below, the feedback control (S20) is continued until the servo start control time tSE ends (S23) and the engaging-side oil pressure PB becomes greater than the target oil pressure PTB (S24). Step S20 is the feedback control.

After the shift up to a2 [%] ends, a predetermined oil pressure change δPFA with a relatively steep gradient is set, and a sweep-down with that gradient is performed (S25).

The releasing-side oil pressure control for the downshift is completed when the releasing-side oil pressure PA reaches "0" (S26). Step S25 is a completion control.

Figure 7:
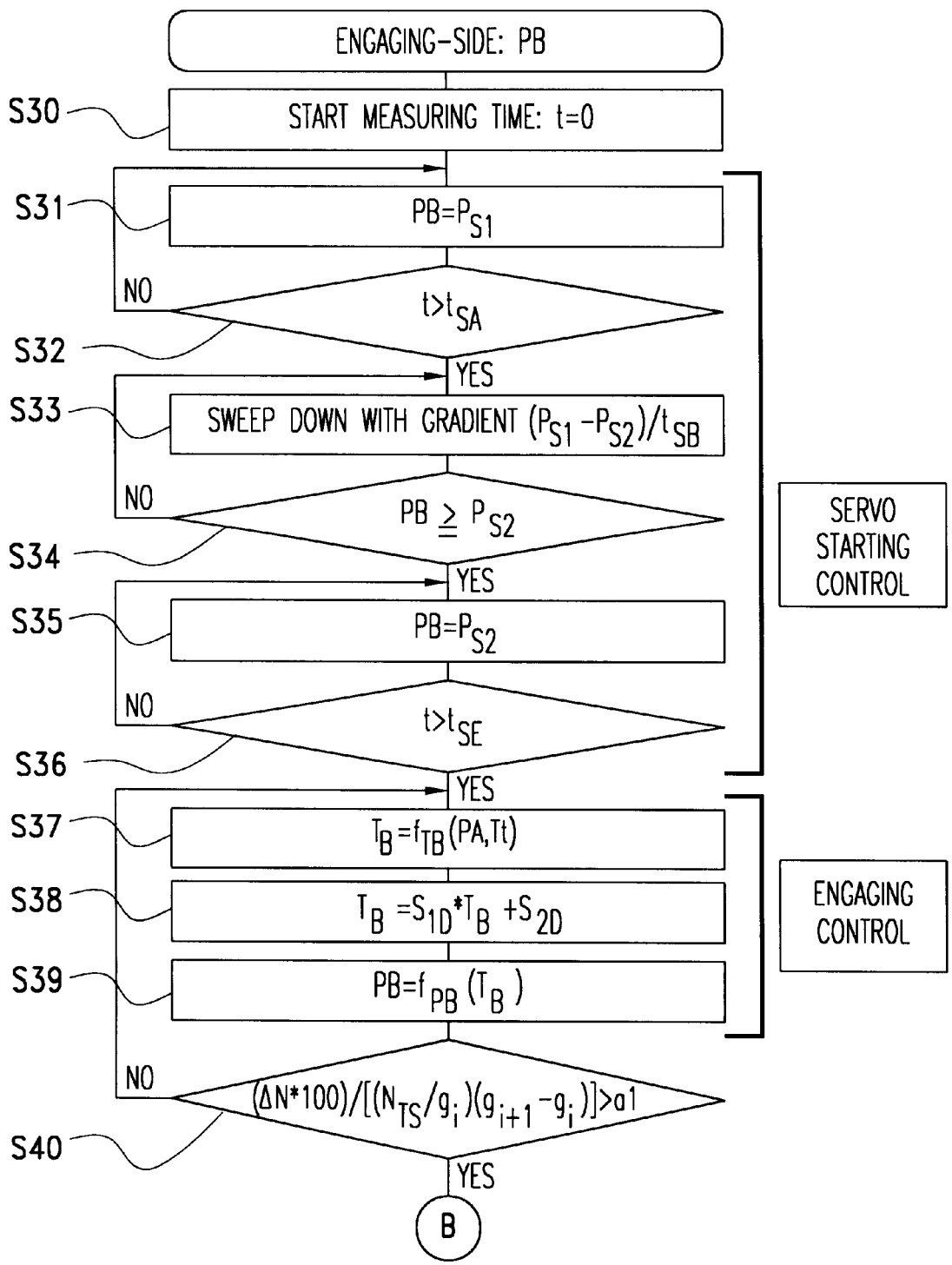
FIG. 7 is a flowchart of a routine for control of engaging-side oil pressure in a clutch-to-clutch downshift.
Figure 8:
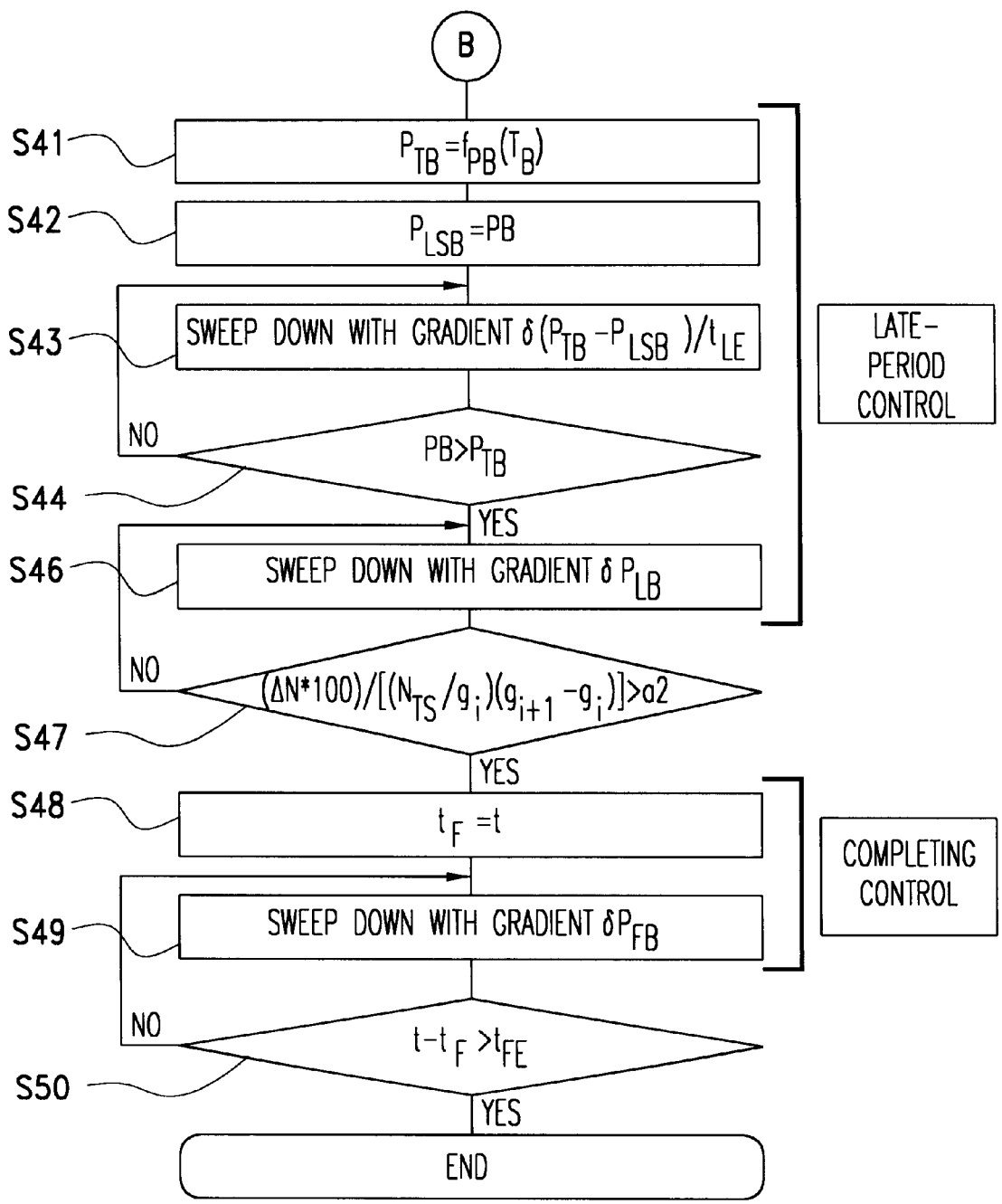
FIG. 8 is a flowchart that is a continuation of that of FIG. 7.

The control of the engaging-side oil pressure PB for the downshift will be described with reference to the flowchart of FIGS. 7 and 8 and the time chart of FIG. 4.

First, time measurement is started upon a downshift command from the control unit 1 (S30). A predetermined signal is output to the linear solenoid valves SLU so that the engaging-side oil pressure PB becomes equal to a predetermined oil pressure PS1 (S31). The predetermined pressure PS1 is set at an oil pressure needed to fill the oil chamber 20 of the hydraulic servo. The predetermined pressure PS1 is maintained for a predetermined time tSA. After the predetermined time tSA has elapsed (S32), the engaging-side oil pressure PB is swept down with a predetermined gradient [(PS1–PS2)/tSB] (S33). When the engaging-side oil pressure PB reaches a predetermined pressure PS2 (S34), the sweep-down is stopped, and the engaging-side oil pressure PB is kept at the predetermined pressure PS2 (S35). The predetermined pressure PS2 is set at a pressure that is greater than or equal to the piston stroke pressure and that does not cause a change in the rotational speed of the input shaft. The predetermined pressure PS2 is maintained until the elapsed time t exceeds a predetermined time tSE (S36). Steps S31 to S36 represent servo starting control.

Thereafter, an engaging-side torque TB is calculated as a function of the releasing-side oil pressure PA and the input torque Tt [TB=fTB(PA, Tt)] (S37). Furthermore, by factoring in the aforementioned allowance rate, an engaging-side torque TB is calculated as TB=S1D×TB+S2D (S38). Subsequently, an engaging-side oil pressure PB is calculated from the engaging-side torque TB [PB=fPB(TB)] (S39). Steps S37 to S29 are engaging control. The control based on the engaging-side oil pressure PB determined from the engaging-side torque TB (which depends on the releasing-side oil pressure PA and the input torque Tt) in step S39 is continued until a1% of completion of the downshift, for example, 70%, is reached (S40). That is, the control is continued until a1 [%] is reached.

$$a1=(\Delta N \times 100)/(NTS/gi)\cdot(gi+1-gi)$$

wherein NTS is the shift initiation-time input shaft rotational speed, $\Delta N$ is the amount of rotational speed change, gi is the pre-shift gear ratio, and gi+1 is the post-shift gear ratio.

If in step S40, a1% of the completed shift change has been exceeded, a later-period control is entered. In this later-period control, first, an engaging-side target oil pressure PTB is calculated from the engaging-side torque TB (S41), and the engaging-side oil pressure PB at the time the amount of rotational speed change reaches a1% is stored as PLSB (S42). Therefore, a predetermined gradient [(PTB–PLSB)/tLE] is calculated from a preset predetermined time tLE, and a sweep-up with the relatively gentle gradient is performed (S43). This sweep-up is continued until the engaging-side oil pressure reaches the target oil pressure PTB (S44). Furthermore, a predetermined gradient δPLB is set, and a sweep-up with this gradient is performed (S46). This sweep-up is continued until the degree of progress of the shift reaches a2%, for example, 90% (S47). Steps S41 through S46 are the later-period control.

Furthermore, an end time tF of the later-period control is set (S48). A relatively steep gradient δPFB is set and a sweep-up with this gradient is performed (S49). This sweep-up is continued for a completing control time tFE (S50). In the case of the power-on, the sweep-up with the gradient δPFB is set with a steep gradient corresponding to the releasing-side oil pressure δPFA related to step S25. Steps S48 and S49 are the completing control.

The control of the releasing-side and engaging-side friction engagement elements for a downshift is basically as in the above-described procedure. After determining a downshift based on the signal outputs of the degree-of-throttle-opening sensor 23, the vehicle speed sensor 26, the shift sensor 27, etc., the ECU 21 controls the downshift type determining portion 21c so as to determine the type of the present downshift, based on a downshift type determining program DTP illustrated in FIG. 11. On the basis of this determination, various control parameters regarding the releasing-side friction engagement element oil pressure PA indicated in FIG. 4 are changed from values for the standard power-on downshift indicated in FIG. 4 to values such that the downshift operation will be in the driver's intention. A specific example of this control will be described below with reference to FIG. 11.

Figure 11:
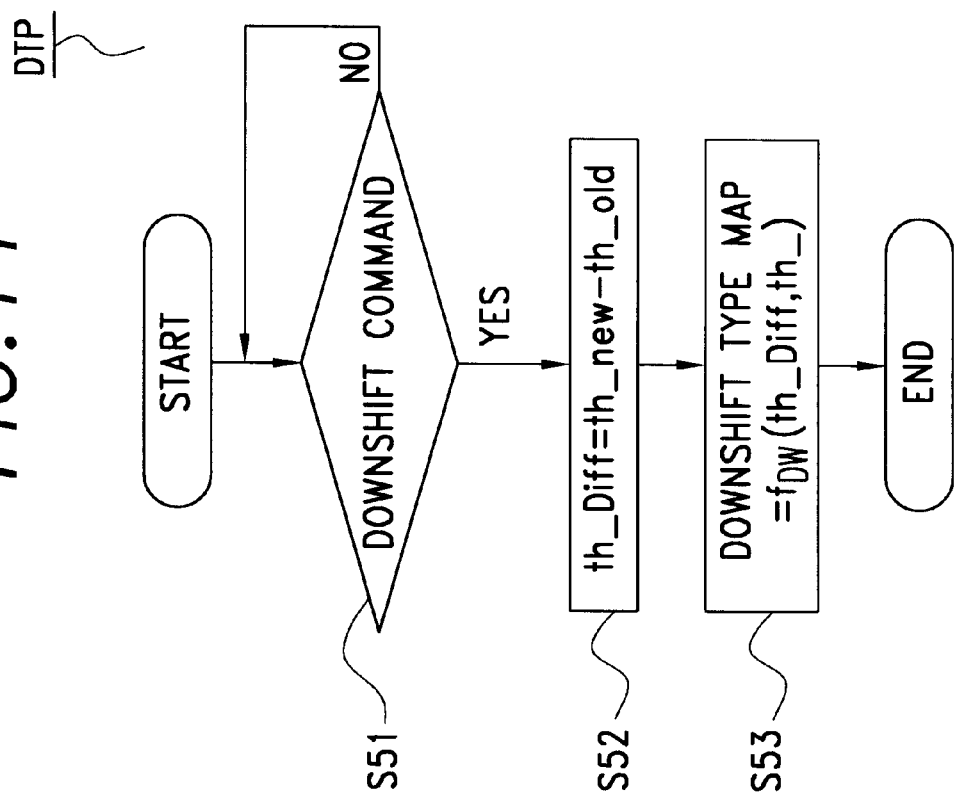
FIG. 11 is a flowchart of one example of a downshift type determining program.

In the downshift type determining program DTP, it is first determined in step S51 in FIG. 11 whether a downshift command has been output. This downshift command may be output during operation in automatic shift mode when the ECU 21 makes a downshift determination based on a shift map stored in memory, or when the driver operates a shift lever in a manner requiring a downshift.

If it is determined in step S51 that a downshift command has been output, the downshift type determining portion 21c proceeds to step S52. In step S52, the degree of throttle opening th_old at the time of the immediately preceding sampling is subtracted from the present degree of throttle opening th_new, and a change in the degree of throttle opening is calculated as a throttle pedal depressing speed th_Diff.

After the throttle pedal depressing speed th_Diff is determined, the routine goes to step S53. In step S53, a determination of the type of downshift is made based on the degree of throttle opening th_and the throttle pedal depressing speed th_Diff, with reference to a downshift type map DTM, e.g., as shown in FIG. 9. In the downshift type map DTM shown in FIG. 9, the automatic shift mode in the D range and the manual shift mode in the manual range are classified separately. Classification is further based on whether the throttle pedal depressing speed th_Diff is less than a predetermined first value th_DiffMin, and whether the throttle pedal depressing speed th_Diff is greater than a predetermined second value th_DiffMax. Downshift type indexes DT, shown in numerical values, are classified in accordance with the throttle pedal depressing speed and the degree of throttle opening th_(%). Therefore, it is determined whether the present shift mode is the automatic shift D range mode or the manual shift and manual range mode, based on the signal from the shift sensor 27 or the like. When the throttle pedal depressing speed th_Diff and the degree of throttle opening th_are determined in step S52 in the downshift type determining program DTP, the corresponding downshift type index DT is immediately determined from the downshift type map DTM. The numerical values provided as the downshift type indexes DT range from "0" to "100", where the value "0" indicates a slow downshift operation with least shock, and the value "100" indicates a quick downshift operation with primary importance being responsiveness.

For example, in a case where, during the automatic shift D range mode and with a degree of throttle opening th_of 35%, the driver depresses the throttle pedal so that the ECU 21 makes a downshift determination, the downshift type index Dt is "0" based on the downshift type map DTM if the throttle pedal depressing speed th_Diff is less than the first value th_DiffMin (e.g., 100%/sec). Since in this case, the throttle pedal depressing speed th_Diff is less than the first value th_DiffMin and the driver slowly depresses the throttle pedal, it is determined that the downshift request is occasioned by climbing a hill or the like, that is, need for a downshift operation with reduced shock is indicated.

In a case where, during the automatic shift D range mode with a degree of throttle opening th_of 75%, the driver depresses the throttle pedal so that the ECU 21 makes a downshift determination, the downshift type index Dt is "100" based on the downshift type map DTM if the throttle pedal depressing speed th_Diff is greater than the second value th_DiffMax (e.g., 160%/sec). Since in this case, the throttle pedal depressing speed th_Diff is less than the second value th_DiffMax and the driver rapidly depresses the throttle pedal, it is determined that the downshift request is made for overtaking another vehicle or the like, i.e., need for a response-critical downshift operation is indicated.

If the throttle pedal depressing speed th_Diff is between the first value th_DiffMin and the second value th_DiffMax, a downshift type index Dt is determined through linear interpolation of the values of the downshift type indexes Dt corresponding to the first value th_DiffMin and the second value th_DiffMax.

Furthermore, a downshift at a position where the degree of throttle opening th_is large, that is, a position where the amount of depression of the accelerator pedal corresponds to a downshift type index Dt of "100", it is determined that the downshift is of a response-critical downshift type, regardless of the magnitude of the throttle pedal depressing speed th_Diff, both during the automatic shift mode and during the manual shift mode, as is apparent from the downshift type map DTM. Therefore, even at a position where the degree of depression of the accelerator pedal is large, for example, a position near the kick-down point or the like, the remaining amount of depression stroke of the accelerator pedal becomes so small that accurate speed cannot be detected and the accelerator pedal depressing speed near the kick-down point cannot be accurately detected, it is possible to determine that the downshift is of a response-critical type. As a result, it becomes possible to prevent a shift shock-critical downshift when the driver desires a quick downshift. That is, in the aforementioned case, a downshift of the type with a good response is determined.

The above-described determination regarding the downshift type based on the downshift type map DTM remains basically the same for the automatic shift mode in the D range and for the manual shift mode in manual range. However, in the case of manual range, the degree of throttle opening th_and the throttle pedal depressing speed th_Diff are smaller in value and the downshift type index Dt is higher in value than in the corresponding automatic shift mode. Therefore, in the case of the manual range, there is a greater tendency to determine a response-critical type downshift.

In a case where, during the manual shift mode in the manual range and with a degree of throttle opening th_of 3% (or less than 3%), that is, a power-off state, the driver depresses the throttle pedal so that the ECU 21 makes a downshift determination, the downshift type index Dt becomes "100", with primary importance placed on responsiveness, based on the downshift type map DTM, regardless of the throttle pedal depressing speed th_Diff. Since in this case, a downshift operation is commanded upon the throttle pedal being depressed in the power-off state, it is determined that there is an urgent need to increase torque, so that a response-critical downshift type index Dt is determined.

However, in a case where the driver depresses the throttle pedal during the manual shift and manual range mode, with a small degree of throttle opening th_of, for example, about 7% to 15%, that is, in an intermediate region between a power-off state where the engine is driven from the wheels (axles 14a, 14b) and a power-on state where the engine is driving the wheels, the downshift type index Dt becomes "0" based on the downshift type map DTM, that is, a determination is made that need for a downshift operation with a reduced shock is indicated and a downshift operation making a transition from the power-off state to the power-on state is smoothly performed.

After the type of downshift operation is determined as a downshift type index Dt by the downshift type determining program DTP, the ECU 21 controls the oil pressure for the early-period shift control of a releasing-side friction engagement element and for the inertia phase control thereof via the releasing-side control means 21a, based on the indexes indicated as the downshift type index Dt. That is, the target oil pressure PTA for releasing the releasing-side friction engagement element in step 7 (FIG. 5), the gradient of the oil pressure change $\delta$PTA for the (second) sweep-down which occurs after reaching the target oil pressure PTA and which is continued until a change in the input shaft rotational speed in step S14, and the gradient of the oil pressure change $\delta$PI for the subsequent sweep-down performed until initiation of a predetermined step shift (step 16), are all changed.

Figure 4:
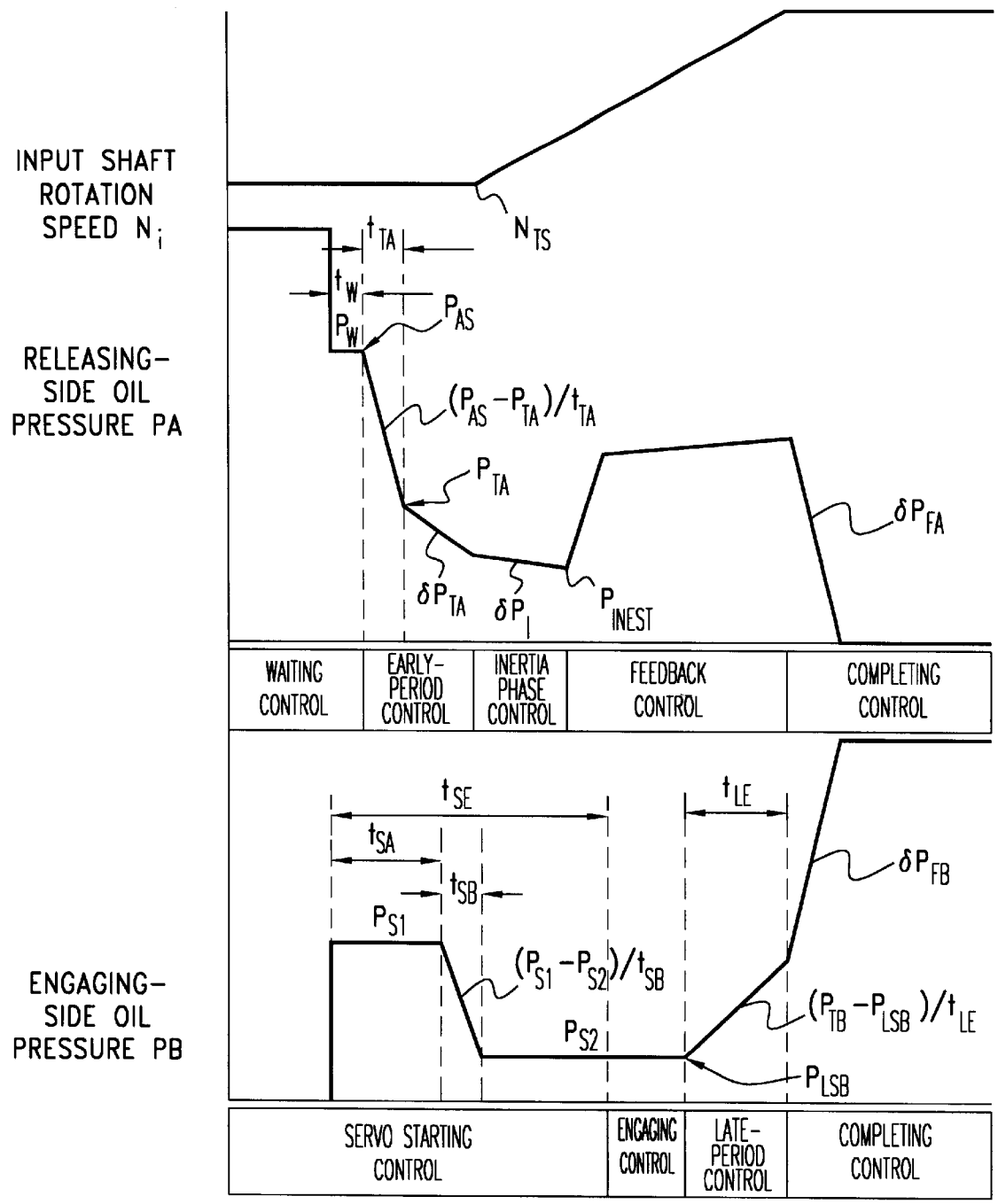
FIG. 4 is a time chart of a clutch-to-clutch downshift.
Figure 10:
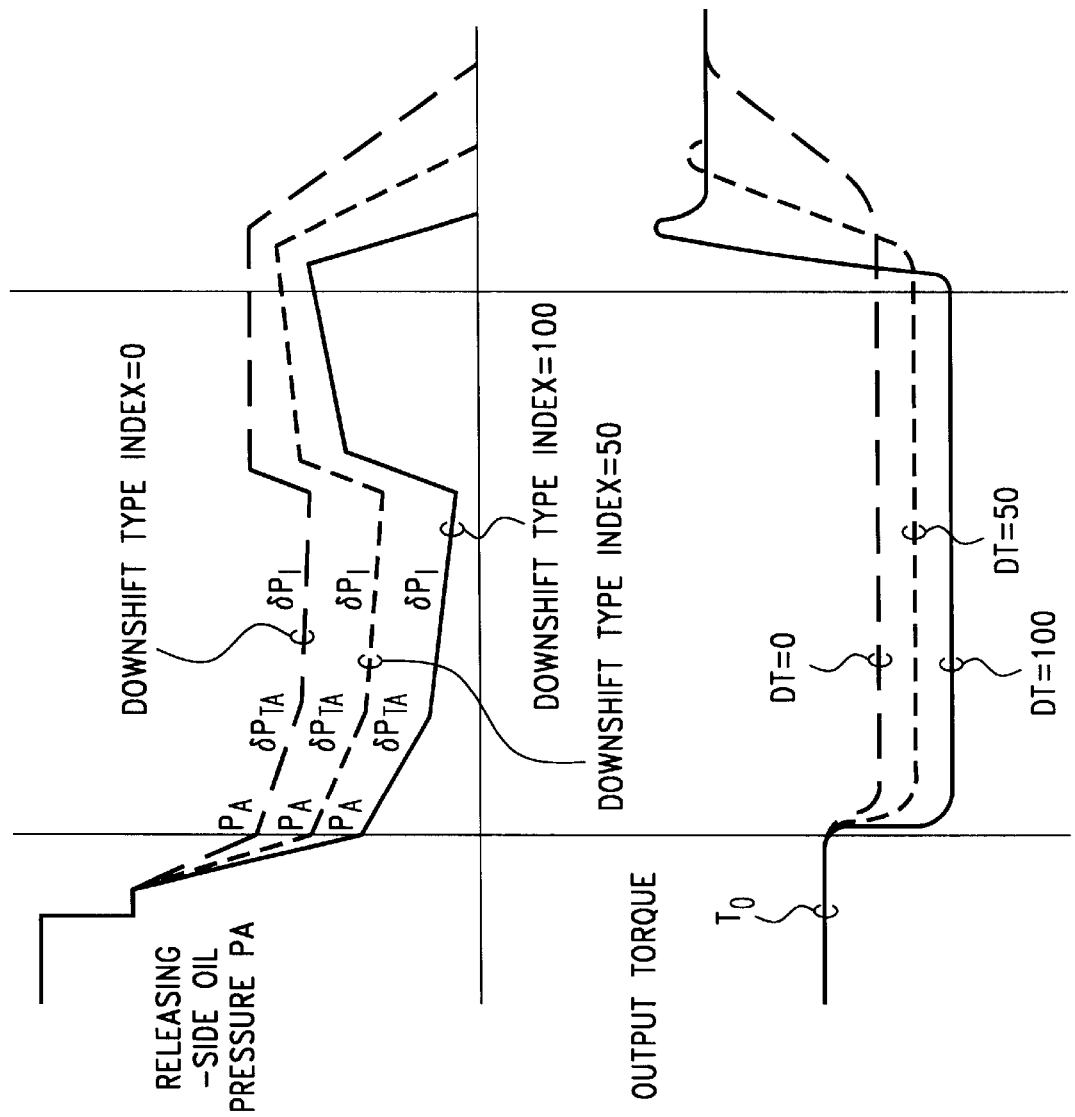
FIG. 10 is a time chart showing control patterns for the release-side oil pressure in accordance with various types of downshifts and output torques during the control operations.

As indicated in FIG. 10, the releasing-side friction engagement element oil pressure PA is subjected to a release control in which the target oil pressure PTA, the gradient of the oil pressure change $\delta$PTA and the gradient of the oil pressure change $\delta$PI are set as in the normal case indicated in FIG. 4, if the downshift type index Dt is "100". Therefore, in such a case, the releasing-side friction engagement element is rapidly released so that a quick downshift operation is executed.

However, with decreases in the downshift type index Dt, the target oil pressure PTA is changed to relatively high values and the gradient of the oil pressure change $\delta$PTA and the gradient of the oil pressure change $\delta$PI are relatively gentle values, so that the release of the releasing-side friction engagement element progresses more slowly. As for the output torque To of the automatic transmission in that case, as the downshift type index Dt becomes smaller, the torque fluctuation during the downshift operation becomes smaller, and the shift shock associated with the downshift operation is correspondingly reduced.

Thus, by release of the releasing-side friction engagement element through suitable control of the oil pressure PA based on the downshift type index Dt, it is possible to execute a downshift in accordance with the driver's intention.

While the invention has been described with reference to what is presently considered to be a preferred embodiment thereof, it is to be understood that the invention is not limited to the disclosed embodiment or constructions. On the contrary, the invention is intended to cover various modifications and equivalent arrangements.

What is claimed is:

1. A speed shift control apparatus for an automatic transmission, comprising an input shaft which receives power from an engine output shaft, an output shaft operatively connected to a wheel, a plurality of friction engagement elements selectively engaged to change a power transfer path between the input shaft and the output shaft; and hydraulic servos that engage and disengage the friction engagement elements, said control apparatus comprising:

a controller that receives input signals from sensors based on vehicle running conditions and that outputs oil pressure control signals, said controller comprising:

control means for controlling the oil pressure to the hydraulic servos operating friction engagement elements for a downshift to a predetermined speed stage, responsive to a downshift command; and downshift type determining means for determining whether the downshift should be a downshift type oriented toward minimum shock or a response-critical downshift type oriented toward responsiveness, based on a detected degree of throttle opening and a detected speed of accelerator pedal depression, a memory containing a map correlating pressure release gradients with degree of throttle opening and detected speed of accelerator depression and wherein said downshift type determining means determines the type of downshift by applying the detected degree of throttle opening and detected speed of accelerator pedal depression to said map, and wherein the control means controls the oil pressure of the hydraulic servos for the friction engagement elements based on the downshift type determined by the downshift type determining means.

2. A speed shift control apparatus for an automatic transmission according to claim 1, wherein a determination of a downshift type by the downshift type determining means is based on a downshift type index map stored in a memory.

3. A speed shift control apparatus for an automatic transmission according to claim 1, wherein the downshift type determining means changes its determination in accordance with whether the downshift command comes from an automatic downshift operation or a manual downshift operation.

4. A speed shift control apparatus for an automatic transmission according to claim 3, wherein the downshift type determining means changes its determination to a determination of the response-critical downshift type, if the downshift command comes from the manual downshift operation.

5. A speed shift control apparatus for an automatic transmission according to claim 3, wherein if the downshift command comes from the manual downshift operation, the downshift type determining means determines that the downshift is the response-critical downshift type, during a power-off state.

6. A speed shift control apparatus for an automatic transmission according to claim 1, wherein the control means includes engaging-side control means for controlling the oil pressure to the hydraulic servo for a friction engagement that is on an engaging-side in the downshift, and releasing-side control means for controlling the oil pressure to the hydraulic servo for a friction engagement element that is on a releasing-side in the downshift, and wherein the releasing-side control means controls the oil pressure to the hydraulic servo for the friction engagement element on the releasing-side based on the downshift type determined by the downshift type determining means.

7. A speed shift control apparatus for an automatic transmission according to claim 6, wherein the releasing-side control means controls the oil pressure to the hydraulic servo for the friction engagement element on the releasing-side so as to change a gradient for decreasing the oil pressure, based on the downshift type determined by the downshift type determining means.

8. A speed shift control apparatus for an automatic transmission according to claim 6, wherein the releasing-side control means controls the oil pressure in an early-period control and an inertia phase control of the friction engagement element on the releasing-side.

\* \* \* \* \*

UNITED STATES PATENT AND TRADEMARK OFFICE
CERTIFICATE OF CORRECTION

PATENT NO. : 6,736,757 B2
DATED : May 18, 2004
INVENTOR(S) : Kubo et al.

It is certified that error appears in the above-identified patent and that said Letters Patent is hereby corrected as shown below:

Title page,
Item [56], References Cited, U.S. PATENT DOCUMENTS,
"6,480,755 B1 *     11/2002     Ootani et al." should read
-- 6,480,775 B1 *                Cho, Yoon-Ho --.

Column 14,
Line 11, after "engagement" insert -- element --.

Signed and Sealed this

Fifth Day of April, 2005

JON W. DUDAS
*Director of the United States Patent and Trademark Office*